US005549096A

United States Patent [19]
Swenson et al.

[11] Patent Number: 5,549,096
[45] Date of Patent: Aug. 27, 1996

[54] LOAD CONTROL OF A SPARE IGNITED ENGINE WITHOUT THROTTLING AND METHOD OF OPERATION

[75] Inventors: Paul F. Swenson, Shaker Heights, Ohio; John W. Bjerklie, Upper St. Clair, Pa.

[73] Assignee: Consolidated Natural Gas Service Company, Inc., Pittsburgh, Pa.

[21] Appl. No.: 488,740

[22] Filed: Jun. 8, 1995

[51] Int. Cl.⁶ .................................................. F02D 23/00
[52] U.S. Cl. ...................... 123/564; 123/184.53
[58] Field of Search ................. 123/564, 184.37, 123/184.45, 184.52, 184.53

[56] References Cited

U.S. PATENT DOCUMENTS

| | | |
|---|---|---|
| 2,789,547 | 4/1957 | Mallory . |
| 3,397,532 | 8/1968 | Hubers . |
| 3,910,241 | 10/1975 | Fujisawa et al. . |
| 3,924,592 | 12/1975 | Miyaki et al. . |
| 4,027,637 | 6/1977 | Aono . |
| 4,030,465 | 6/1977 | Nakagami et al. . |
| 4,036,015 | 7/1977 | Hata et al. ................... 60/282 |
| 4,051,672 | 10/1977 | Masaki et al. ................ 60/277 |
| 4,051,673 | 10/1977 | Masaki ......................... 60/282 |
| 4,051,674 | 10/1977 | Suzuki ......................... 60/282 |
| 4,051,816 | 10/1977 | Masaki . |
| 4,056,931 | 11/1977 | Hata ............................. 60/274 |
| 4,061,118 | 12/1977 | Kiyota . |
| 4,068,473 | 1/1978 | Masaki ......................... 60/282 |
| 4,068,637 | 1/1978 | Takamiya . |
| 4,106,448 | 8/1978 | Noguchi et al. . |
| 4,125,098 | 11/1978 | Kiyota . |
| 4,132,198 | 1/1979 | Masaki et al. . |
| 4,448,164 | 5/1984 | Ishida .......................... 123/432 |
| 4,449,505 | 5/1984 | Tezuka et al. ................ 123/432 |
| 4,452,218 | 6/1984 | Yokoyama et al. .......... 123/579 |
| 4,497,288 | 2/1985 | Nakano et al. . |
| 4,515,127 | 5/1985 | Katsuoka ..................... 123/430 |
| 4,517,947 | 5/1985 | Nishikawa et al. .......... 123/489 |
| 5,081,977 | 1/1992 | Swenson ...................... 123/527 |
| 5,249,560 | 10/1993 | Gian et al. .................... 123/443 |
| 5,390,646 | 2/1995 | Swenson ...................... 123/525 |

*Primary Examiner*—Michael Koczo
*Attorney, Agent, or Firm*—Pearne, Gordon, McCoy & Granger

[57] ABSTRACT

A spark ignited engine and method of its operation in which throttling losses are substantially eliminated has two intake manifolds operating at different charge air density levels. Suitable valves, upstream of conventional cylinder intake valves, are controlled to supply each of the cylinders with charge air from one or the other manifold. At high loads under operation of a controller all of the cylinders are supplied from the high density charge air manifold and at low loads all of the cylinders are supplied from the low density charge air manifold. At intermediate loads the controller supplies an appropriate number of cylinders from the high density manifold and the remaining cylinders from the low density manifold.

22 Claims, 2 Drawing Sheets

LOAD CONTROL OF A SPARE IGNITED ENGINE WITHOUT THROTTLING AND METHOD OF OPERATION

BACKGROUND OF THE INVENTION

The invention relates to spark ignited internal combustion engines and, in particular, to an engine construction with improved operating efficiency.

PRIOR ART

In general, prior art spark ignited internal combustion engines, when compared to diesel engines, for example, exhibit limited operating efficiency particularly when running at low power levels. This situation results largely from throttling losses where an engine, with a throttle closed or nearly closed, in effect, is acting as a vacuum pump and this pumping energy is not recovered as useful work. Busses, trucks and other heavy duty vehicles, for example, are used in applications where a large proportion of the time they are operated their engines are running at low power levels. Busses and trucks run at low power levels when idling or cruising at low or moderate speeds. In the case of a city transit bus, the horsepower produced by an engine at idle may be as low as 25 horsepower in the winter or otherwise when there is no air conditioning load. Even with an air conditioning load the horsepower being developed can be in the order of 50 horsepower. These horsepower levels are developed to overcome frictional losses and drive ordinary accessories such as a water pump, alternator, power steering pump, air compressor and the like. Similar low power idle operation exists in other types of vehicles such as urban delivery trucks and urban refuse collection trucks. Typically, a spark ignited engine for these described types of vehicles can have a full power rating in the order of 300 horsepower. Whenever a conventional engine of this power capacity is utilized at substantially less than its rated power, fuel efficiency suffers because of throttling losses. These losses, in terms of fuel consumption, can be considerable when the engine operates at lower power for significant periods in its duty cycle.

SUMMARY OF THE INVENTION

The invention provides a method and apparatus for operating a spark ignited internal combustion engine in a manner that substantially reduces loss of fuel efficiency at low power level operation. The improvement in fuel efficiency is accomplished by avoiding throttling losses through a technique of supplying air to the engine simultaneously at two different densities and, therefore, at two different volumetric energy levels. The various cylinders of the engine are supplied from one or the other air density level depending on the existing power demand on the engine. As disclosed, dual manifolds supply air at the two density levels and associated valves are operated for selection of an appropriate manifold for each cylinder. In a preferred manner, when a low level power demand is present all or most of the cylinders of a multi-cylinder engine are fed from a low density manifold. Conversely, when a high power level is demanded, all or most cylinders are supplied from the high density manifold. At intermediate power levels, the manifold valving is controlled to feed certain cylinders low density air from one manifold and the other cylinders high density air from the other manifold.

Natural gas is recognized as a desirable fuel for internal combustion engines in vehicle applications because of its relatively clean burning characteristics.

In accordance with a preferred embodiment of the invention, cryogenically stored liquid natural gas (LNG) is used as a fuel and its heat of vaporization is used to intercool compressed charge air for improved engine performance. Compressed intercooled air forms the relatively high density charge air and is directed to a first manifold. Low density charge air for the second one of the manifolds is produced by heating it with exhaust gases and thereby reducing its density from that of atmospheric conditions. Ideally, the low density heated air in the second manifold is combined with a ratio of natural gas fuel which is characterized as ultra lean thereby further reducing the energy density.

The performance of the engine is improved at high power levels by the low temperature levels of the intake air that are achieved by intercooling with the LNG. This relatively low level temperature intercooling allows the engine to run at relatively high compression ratios without knock or predetonation. It has been demonstrated that with this LNG-based intercooling, a spark ignited engine can be successfully operated at compression ratios of as high as 17 to 1 with corresponding high efficiency levels.

From the foregoing it can be understood that a wide difference in energy value, on a volumetric basis, is available between the manifolds. By regulating the number of cylinders receiving a high energy charge and the number receiving a lower energy charge the output of the engine can be matched to the existing power demand without significant throttling losses.

DESCRIPTION OF THE PREFERRED EMBODIMENT

Figure 1:
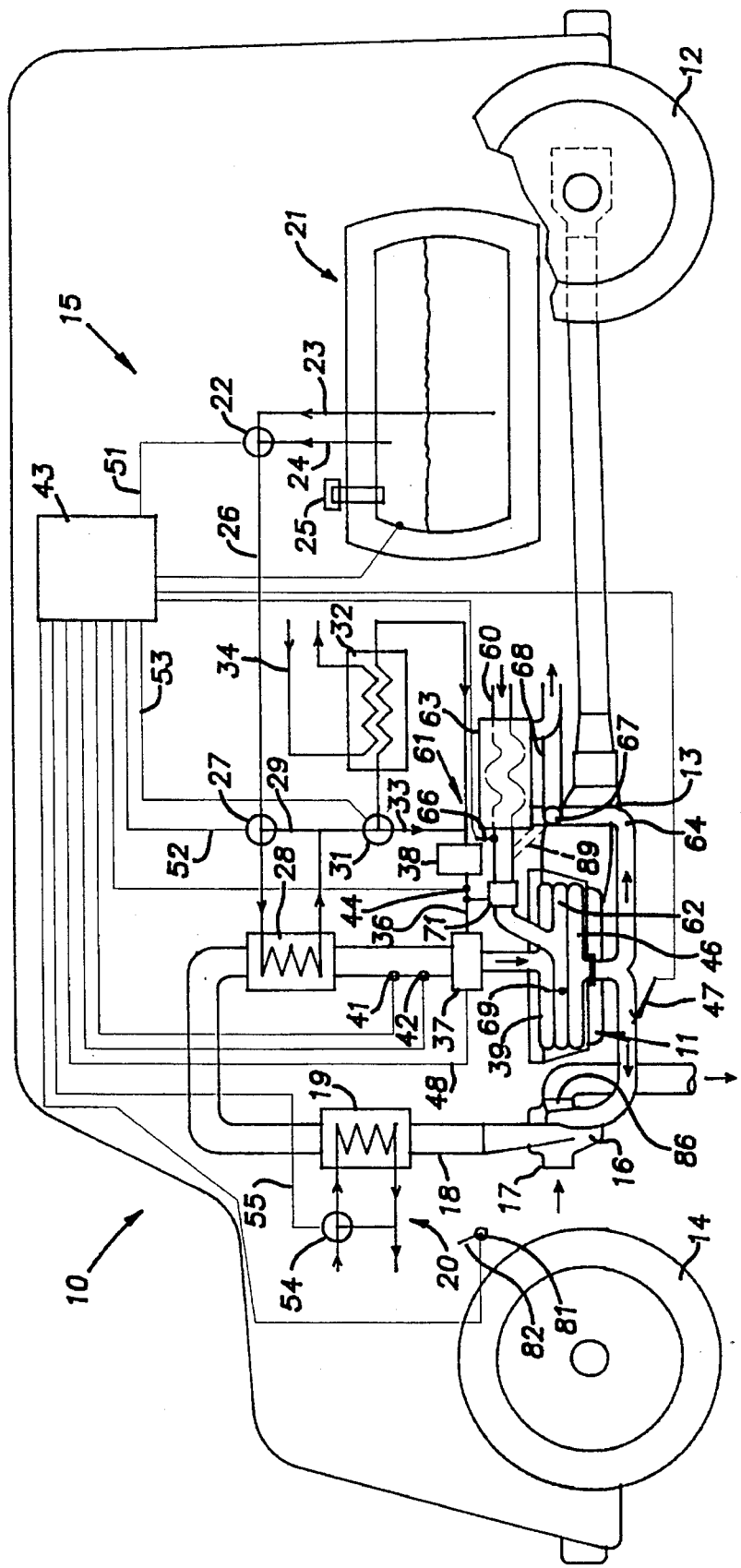
FIG. 1 is a schematic illustration of a vehicle powered by an engine operated in accordance with the invention.

A vehicle embodying the invention is diagrammatically represented at 10 and is, for instance, a heavy-duty land vehicle such as a truck of a gross weight in excess of 14,000 lbs. or a large urban passenger bus. U.S. Pat. Nos. 5,081,977 and 5,390,646, incorporated herein by reference disclose similar vehicles. The vehicle 10 includes a power plant in the form of an internal combustion multi-cylinder engine 11 of the spark ignition type, driving a set of propulsion wheels 12 through a drive train 13. A set of front wheels 14 provide for steering of the vehicle in a known manner. The engine 11, in the illustrated example, is fitted with a conventional turbocharger 16. The turbocharger 16 utilizes energy from the exhaust of the engine 11 to compress charge air to be combusted by the engine 11. Charge air is drawn from the atmosphere into an inlet 17 of the turbocharger 16 and is compressed to a pressure which, when the engine is under load, is substantially above atmospheric pressure reaching, for example, 7 psig. Air compressed by the turbocharger 16 is substantially elevated in temperature as a result of the compression process which occurs externally of the engine 11. The charge air after compression in the turbocharger 16 is conducted by a supply conduit 18 to an intercooler 19 which is either of the air cooled type or of the water cooled type, both known in the art. A cooling fluid circuit for the intercooler 19 is shown at 20. The intercooler 19 serves to cool the compressed charge air exiting the turbocharger 16 at a temperature of, for example, about 250° F., to a substantially lowered temperature in the range of about 150° F., for example.

The engine 11 is supplied fuel from a tank 21 carried on the vehicle 10 through a control system 15. The fuel in the tank 21 is LNG and natural gas vapor stored at cryogenic temperatures of, for example, −260° F. and at a pressure of, for example, at least 10 psi and usually not more than 75 psi. A port 25 for refilling the tank 21 is provided. The tank 21, fuel lines, and associated componentry carrying the fuel to the engine 11 are cryogenically insulated as needed according to known techniques.

Natural gas fuel from the tank 21 is delivered to a valve 22 in liquid form through a line 23 and in gaseous form through a line 24. From the valve 22 the natural gas is conveyed through a supply line 26 to a control valve 27 that directs it either through a natural gas intercooler 28 or causes it to bypass this intercooler through a line 29. The natural gas intercooler 28 is arranged to allow natural gas flowing through it to absorb heat from the charge air flowing through the supply conduit 18. The natural gas intercooler 28 is downstream of the conventional intercooler 19 with reference to the flow of charge air from the turbocharger 16 to the engine 11. The natural gas intercooler 28 has the general construction of a conventional air-to-air intercooler known in the art.

Natural gas fuel passing through either the intercooler 28 or the bypass line 29 is carried to a control valve 31 that directs it either through a heat exchanger 32 or a line 33 bypassing this heat exchanger. The heat exchanger 32 is supplied a continuous flow of heating fluid such as jacket water or exhaust from the engine 11 through a circuit 34 while the engine is operating to avoid frost build-up within the heat exchanger 32. From the heat exchanger 32 or from the line 33 natural gas is conveyed by a line 36 to a fuel injector 37 on a first intake manifold 39 of the engine 11. A pressure regulator 38 of generally known construction is positioned in the line 36 to limit supply pressure of natural gas to the fuel injector 37 to a desirable level of, for example, 10 psig. The fuel injector 37 is of generally known construction and mixes charge air received through the supply or delivery line 18 with natural gas in the gaseous state received through the line 36.

The pressure and temperature of the charge air in the line 18 adjacent the fuel injector 37 is monitored by sensors 41, 42 respectively and corresponding electrical signals are conveyed to a load mode controller 43. Additionally, the temperature of the natural gas fuel is monitored by a sensor 44 in the line 36 and a corresponding electrical signal is conveyed to the controller 43. The controller 43 is connected to control the positions of the directional control valves 22, 27 and 31 through lines 51–53, respectively. Additionally, the controller 43 operates a directional control valve 54 at the intercooler circuit 20 via a control line 55.

The fuel control valve 22 under the direction of the controller 43 supplies LNG from the line 23 to the intercooler 28 where heat is absorbed from the charge air and the natural gas is simultaneously heated. From the intercooler 28 the charge air passes to the fuel injector 37 and then into the first intake manifold to be drawn into the cylinders of the engine for combustion. The intercooler 28 is operated to reduce the temperature of the charge air typically from about 150° F., for example, as it leaves the first intercooler 19 preferably to the dew point or to the frost point of the air depending, for instance, on the engine manufacturers' specifications. When the charge air is lowered to a desired temperature as measured by the sensor 42, the controller 43 modulates the valve 27 so that some or all of the LNG moves through the bypass line 29 to match the engine's fuel requirements while not overcooling the charge air.

The fuel tempering heat exchanger 32 ensures that fuel delivered to the fuel injector 37 is fully vaporized and tempered to a suitable control temperature above the frost point or the dew point, as desired. The controller 43, accordingly, monitors the temperature of fuel at the injector 37 through the sensor 44 and operates the valve 31 to direct as much of the natural gas fuel through the heat exchanger 32 as is necessary to meet the engine's current fuel requirements and absorb as much heat into the fuel as is necessary to reach the desired control temperature. Where little or no heat is required to be added to the fuel, the valve 31, under direction of the controller 43, permits the appropriate quantity of fuel to bypass the heat exchanger 32 to ensure that the natural gas fuel is not overheated to a temperature above that desired.

Atmospheric charge air is drawn into a second inlet 60 that is ducted along a path 61 to a second intake manifold 62 of the engine 11. A gas-to-gas heat exchanger 63, of known construction, forms a portion of the charge air path 61 between the intake 60 and manifold 62. Exhaust gas from the exhaust manifold 46 is directed to the heat exchanger 63 by a conduit 64 so that the charge air entering the inlet 60 can be heated to a desired temperature as monitored by a sensor 66 to which the controller 43 is wired. A valve 67 operated by the controller 43 is actuated to bypass exhaust gas through a diverter pipe 68 away from the heat exchanger 63 to thereby regulate the temperature of the charge air entering the manifold 62. A sensor 69 allows the controller 43 to monitor the pressure in the manifold 62. The fuel line 36 is connected to a second fuel injector 71 for the manifold 62.

Figure 2:
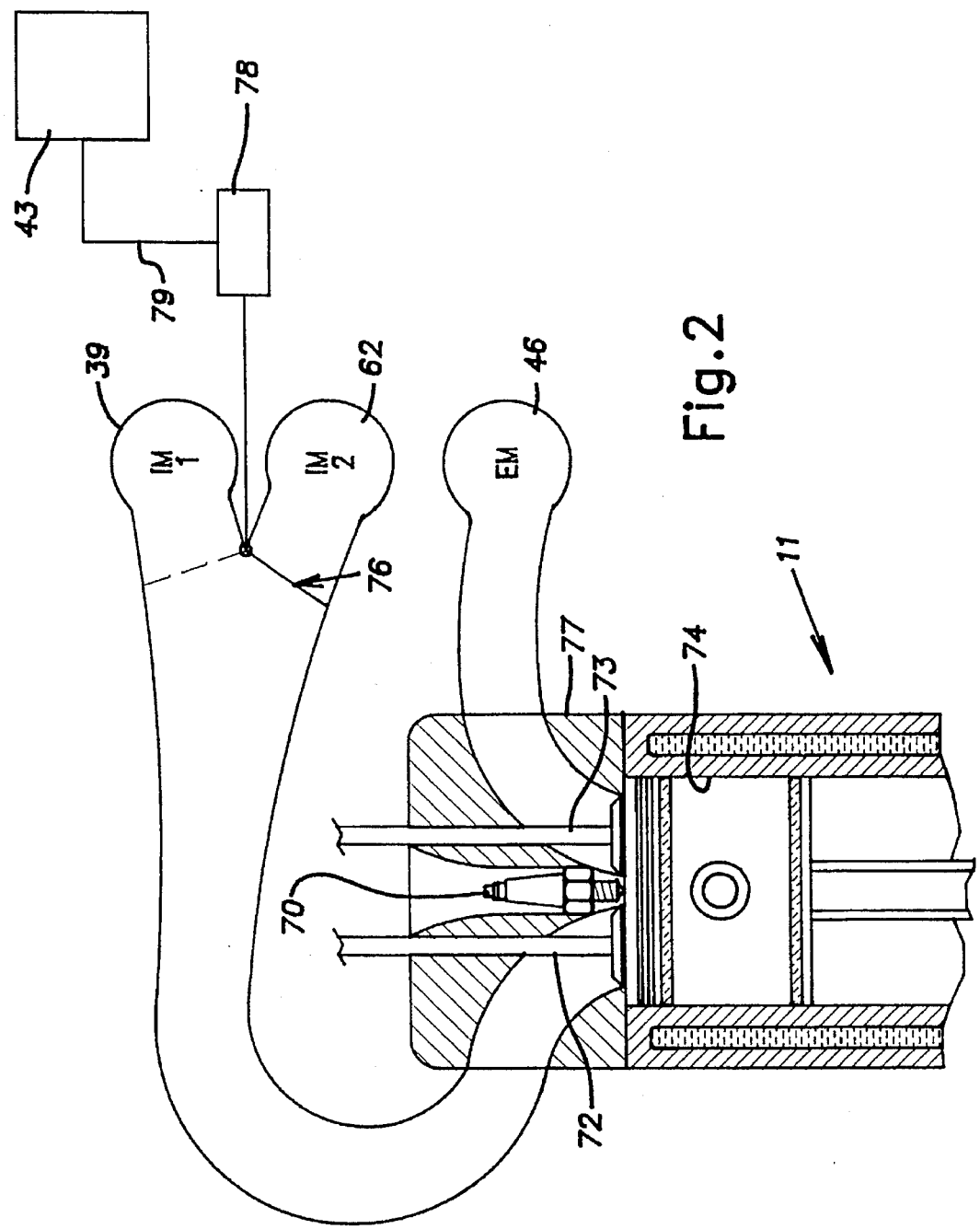
FIG. 2 is a schematic illustration of a manifold circuit of the engine.

With reference to FIG. 2, each cylinder of the engine, as is conventional, includes a spark plug 70 and intake and exhaust valves 72, 73, respectively. Each cylinder, designated 74, communicates, alternatively, with both intake manifolds 39 and 62 through an associated two-position valve 76. The valve 76 is arranged so that, except for a negligible period during a shift in its position, charge air from only one manifold 39 or 62 is available to a cylinder at any given time. In the preferred embodiment, each cylinder 74 has its own separate valve 76 although other arrangements where a valve equivalent to the valve 76 serves two or more cylinders contemporaneously are contemplated. As shown, the two-position valve 76 is upstream of the conventional intake poppet valve 72 in the head, designated 77 of the associated cylinder 74. A separate actuator 78, such as a solenoid, associated with each valve 76, selectively shifts the valve between the solid line position and the dotted line position under the control of the controller 43 through a line 79.

In accordance with the invention, the controller 43, by monitoring the load on the engine through the various described sensors and a sensor 81 responsive to the position of an accelerator or speed control 82, determines what cylinders 74 are fed from the high charge air density intake manifold 39 and what cylinders are fed from the low density manifold 62. At or near full load, the controller 43 directs all of the valves 76 to positions for delivery of charge air from the high density manifold 39. For typical air fuel ratios, the volumetric energy level of this manifold 62 is high because the charge air is compressed by the turbocharger 16 and because this air is intercooled, so as to create high density charge air as described. Conversely, when the load on the engine is at or near minimum levels, the controller 43 directs all of the valves 76 to positions for delivering charge air from the low density manifold 62. The density of air in this manifold, as discussed, is low because it has been heated by the exhaust gases and it is not above atmospheric pressure.

As discussed more fully hereinbelow, the first manifold can be operated with a lean mixture of an air fuel ratio (AFR) of about 26–28 to 1. The second intake manifold 62 is maintained with an ultra lean burn mixture (AFR=28–30 to 1). From an understanding of the relative densities of air in the manifolds 39 and 62 as well as their respective air fuel ratios, it will be clear that the high density manifold 39 is capable of charging a cylinder with substantially more energy during a given intake stroke than that of which the other manifold 62 is capable.

At intermediate power levels, such as when the vehicle is travelling at moderate constant speeds, the controller 43 establishes a combination of cylinders being fed from both intake manifolds 39 and 62. The combination of cylinders is selected so that their total power output is equal to the existing demand. It is desirable that the controller 43 favors a combination of cylinders that will result in an even firing sequence in the engine. For example, for an in-line 6-cylinder engine feeding cylinders 4, 5 and 6 from the manifold 39 and cylinders 1, 2 and 3 from the manifold 62 will result in an even firing sequence. Feeding cylinders 1 and 6 from the manifold 39 and 2, 3, 4 and 5 from the manifold 62 will also result in an even firing mode.

It will be understood that the valves 76 need not operate in synchronization with the stroke of the respective pistons of the cylinders they serve and, accordingly, can be operated with relatively simple mechanisms such as an electrical solenoid 78 as described or other actuators operated hydraulically or pneumatically under the control of the controller 43.

The engine operates in an efficient manner under various expected load conditions. At full power, the intercooling of the charge air delivered to the manifold 39 allows a relatively high compression ratio to be used in the engine without knock. It is expected that in many instances, sufficient modulation in engine power from maximum to minimum, without throttling, will be achieved when a lean burn mixture of an air fuel ratio of about 26–28 to 1 is used in the manifold 39. A waste gate 86 on the turbocharger 16 under the control of the controller 43 can be used to modulate the compression of the charge air, as desired, between, for example, 1 to 2 atmospheres. Where greater power is required from the engine or greater modulation between high and lower power in the engine is required, the controller 43 can maintain a stoichiometric mixture in the manifold 39, such a mixture of air and natural gas fuel being about 17 to 1.

Charge air exiting the heat exchanger 63 preferably is heated to a temperature of about 450° to 500° F. but may be heated to temperatures ranging up to 900° F. The high temperature of the air distributed from the manifold 62 allows an ultra lean burn mixture of an air fuel ratio of 28–30 to 1 for low emissions and high efficiency. It can be demonstrated that at a given engine speed, the difference in indicated engine torque or horsepower produced by cylinders fed exclusively by the high density manifold 39 as compared to that produced by the low density manifold 62 is in the ratio of 4 to 1 if both manifolds use a lean burn mixture. If a stoichiometric mixture is used in the high density manifold 39 a ratio of power is in the order of 6 to 1. Since typical vehicle operations fall within a range of 4 to 1 between low load and full load, it will be understood that essentially no throttling will be necessary. A throttle plate or its equivalent may be provided for the manifolds 39 and 62 for purposes of safety or improved controllability. Optionally, a conduit 89, shown in dotted line, can be provided to recirculate exhaust gas into the manifold 62 for intermixing with, diluting and directly heating fresh charge air that has been preheated in the heat exchanger 63. As another option, recirculated exhaust gas can be introduced through the line or conduit 89 into the manifold 62 with fresh charge air from the inlet 60 in sufficient quantities to provide enough direct heating of the fresh charge air so as to eliminate the use of the heat exchanger 63. The recirculated exhaust gases improve the anti-knock or anti-detonation characteristics of the air fuel charge in addition to reducing the actual quantity of fresh charge air and fuel (and therefore energy) being drawn into a cylinder on each stroke.

Natural gas fuel can be injected directly into the cylinders rather than being introduced through the manifolds. The fuel can be natural gas supplied from a fuel tank in which the gas is stored in gaseous form under high pressure such as 3000 to 4000 psi; in this case the charge air in the cooler of the manifolds would be at ambient or above ambient temperatures unless it was cooled by a refrigeration circuit. Still further, it is contemplated that the engine can be operated with no fuel to the cylinders being supplied by the high temperature manifold. Other known fuels, like or unlike natural gas, can be utilized to practice certain aspects of the invention.

It should be evident that this disclosure is by way of example and that various other changes may be made by adding, modifying or eliminating details without departing from the fair scope of the teaching contained in this disclosure. For example, natural gas fuel can be injected directly into the cylinders rather than being introduced through the manifolds. The invention is therefore not limited to particular details of this disclosure except to the extent that the following claims are necessarily so limited.

We claim:

1. A power plant for a variable load application comprising an internal combustion multi-cylinder engine, a fuel tank connected to supply fuel to the engine, first and second intake manifolds for supplying charge air to the engine, the first manifold supplying relatively high density air and the second manifold supplying relatively low density air and control means to determine which of said manifolds feeds which of said cylinders of the engine, the control means being arranged to feed a majority of cylinders exclusively from the first manifold under conditions of relatively high load and to feed a majority of the cylinders exclusively from the second manifold under relatively light loads and to feed a limited number of the cylinders exclusively from the first manifold and a limited number of the cylinders exclusively from the second manifold during moderate loads whereby the power output of the engine is regulated without substantial throttling losses at low and moderate power levels.

2. A power plant as set forth in claim 1, including means to heat the charge air in the second manifold with exhaust heat from the engine to a temperature substantially above ambient.

3. A power plant as set forth in claim 1, including a compressor to increase the pressure of air in the first manifold to a pressure above atmospheric pressure.

4. A power plant as set forth in claim 3, including intercooler means to reduce the temperature of the air leaving the compressor.

5. A power plant as set forth in claim 4, wherein said fuel tank contains LNG and including a heat exchanger for intercooling the compressed air.

6. A power plant as set forth in claim 1, including a gas-to-gas heat exchanger for heating the charge air passing through the second manifold.

7. A power plant as set forth in claim 6, including a conduit for introducing exhaust gas into direct intermixing contact with the charge air passing through the second manifold.

8. A power plant as set forth in claim 1, including a conduit for introducing an exhaust gas into direct intermixing contact with the charge air passing through the second manifold.

9. A power plant as set forth in claim 5, including an ambient air heat exchanger for cooling said compressed air upstream of said intercooler.

10. A method of operating a multi-cylinder spark-ignited internal combustion engine comprising providing two intake manifolds for the engine, supplying high density charge air in one of the manifolds and low density charge air in the other manifold, feeding all of the cylinders exclusively from the high density manifold when the engine is running at full load, feeding all of the cylinders exclusively from the low density manifold when the engine is running at light load, and feeding some of the cylinders exclusively from the high density manifold and other cylinders exclusively from the low density manifold when the engine is running at moderate loads.

11. A method as set forth in claim 10, wherein the high density manifold is supplied by a compressor driven by the engine.

12. A method as set forth in claim 11, wherein the compressor is provided in the form of a turbocharger.

13. A method as set forth in claim 11, wherein the compressed air is intercooled before being introduced into the high density manifold.

14. A method as set forth in claim 13, wherein LNG fuel is used with the engine and the heat of vaporization of the LNG is used to intercool the compressed charge air.

15. A method as set forth in claim 11, wherein the charge air in the low density manifold is heated by exhaust gas.

16. A method as set forth in claim 15, wherein the charge air in the low density manifold is heated in a gas-to-gas heat exchanger.

17. A method as set forth in claim 16, wherein the charge air in the low density manifold is heated by exhaust gas recirculation through the low density manifold.

18. A method as set forth in claim 15, wherein the charge air in the low density manifold is heated by exhaust gas recirculation through the low density manifold.

19. A method as set forth in claim 15, wherein the charge air in the low density manifold is heated to a temperature of about 450° to 500° F.

20. A method as set forth in claim 11, wherein the compression of the charge air is modulated to a range of about 1 to 2 atmospheres.

21. A method as set forth in claim 20, wherein the modulation of the compression of the charge air is accomplished by a waste gate of a turbocharger producing the compression.

22. A method as set forth in claim 15, wherein the charge air in the low density manifold is mixed with fuel in an ultra lean air fuel ratio.

* * * * *